C. HEDDON.
FISH BAIT OR LURE.
APPLICATION FILED FEB. 27, 1914.
1,114,137.
Patented Oct. 20, 1914.
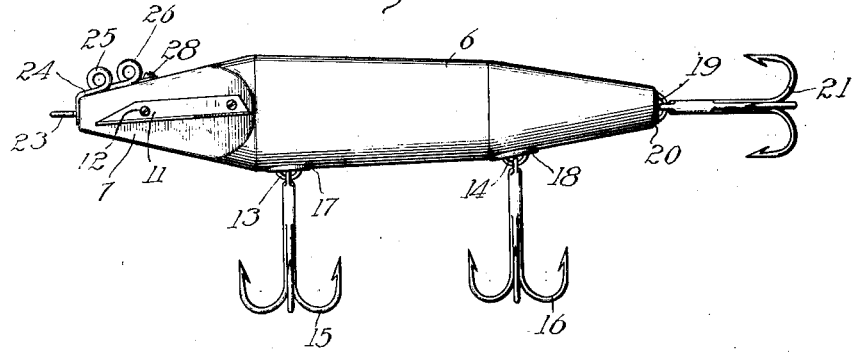
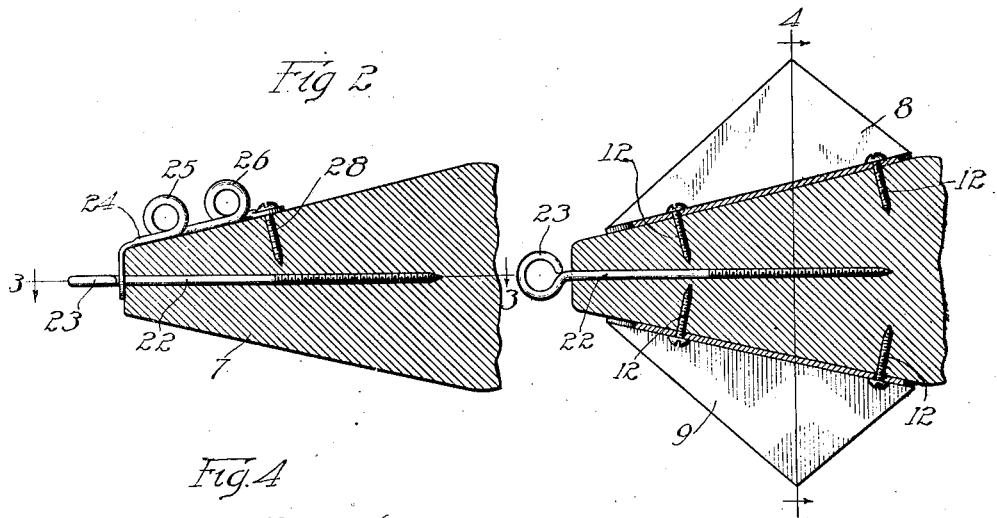
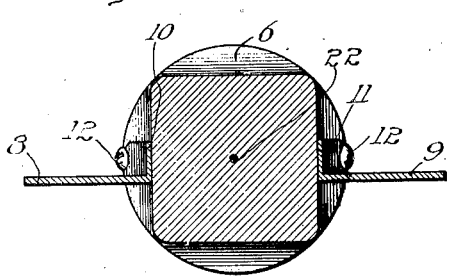
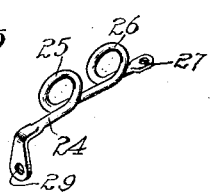
Witnesses:
Arthur W. Carlson
N. Morris Hunason
Inventor:
Charles Heddon
by Jones, Addington, Ames & Seibold
Attys.

UNITED STATES PATENT OFFICE.

CHARLES HEDDON, OF DOWAGIAC, MICHIGAN.

FISH BAIT OR LURE.

1,114,137.  Specification of Letters Patent.  Patented Oct. 20, 1914.

Application filed February 27, 1914. Serial No. 821,438.

*To all whom it may concern:*

Be it known that I, CHARLES HEDDON, a citizen of the United States, residing at Dowagiac, in the county of Cass and State of Michigan, have invented new and useful Improvements in Fish Baits or Lures, of which the following is a full, clear, concise, and exact description, reference being had to the accompanying drawing, forming a part of this specification.

My invention relates to improvements in fish baits or lures.

It is one of the principal objects of my invention to provide a fish lure that will closely resemble a live fish in its movement, under varying water conditions.

In fishing with an artificial minnow it is oftentimes deemed desirable to have the minnow make a darting or wabbling motion as it is drawn through the water. In fish lures as heretofore known the line is attached to an eyelet or similar device at the end of the nose. With such a construction the above mentioned darting effect is attained when the lure is reeled against the swift current of a river, but under such conditions only, and there is no way to vary it. When the lure is drawn through still water, due to the fact that the line is attached at the snout it moves in substantially a straight line and the advantages derived from the darting movement are lost. By my invention, however, I make it possible to vary this motion of the lure and to attain it under all conditions by providing variable line fastening means, the point of attachment selected depending on the water conditions and the degree of darting desired.

In the following specification and accompanying drawings I have described and illustrated, as an example, one form of my invention, but I wish it clearly understood that numerous changes may be made in the form, construction and arrangement of the parts without departing from the spirit of the invention or exceeding the scope of the appended claims, the form of the invention herein disclosed being merely one preferred embodiment thereof.

In the drawings Figure 1 is a view in side elevation of a fish lure constructed in accordance with my invention; Fig. 2 is an enlarged view showing a portion of Fig. 1 in cross section; Fig. 3 is a similar view, the section being taken on line 3—3 of Fig. 2; Fig. 4 is a cross sectional view taken on the line 4—4 of Fig. 3, looking in the direction of the arrows; and Fig. 5 is a perspective detail showing the variable line fastener removed from the lure body.

Like reference characters refer to like parts throughout the following specification and the several figures of the accompanying drawings.

Referring to the drawings 6 represents an artificial fish body constructed of wood or other suitable material and ornamented as desired. The body 6 is tapered at its forward end to form a substantially pointed nose 7. With the nose 7 are associated a pair of wings or fins 8, 9. These fins, the function of which is hereinafter referred to, are preferably made of sheet metal and are substantially triangular in shape and tilted slightly. Along their inner edges the fins 8, 9 are formed with upwardly extending flanges 10, 11 and these flanges are secured to the body 6 on opposite sides thereof by screws 12. On the under side of the body 6 are two eyes 13, 14 for the usual hooks 15, 16, the body being protected by eyelets 17, 18 surrounding the eyes 13, 14. At the rear end is an eye 19, likewise surrounded by an eyelet 20, to which is secured a trailing hook 21. A threaded stem 22 is inserted in the forward point of the nose 7, the outer end of the stem terminating in an eye 23. Associated with the eye 23 is a variable line fastening member 24 which comprises essentially two eyes 25, 26 placed near eye 23, and positioned one behind the other. As clearly shown in Fig. 5 these eyes are formed by twice looping a small piece of wire. This wire is flattened at its rear end, the flattened portion being provided with a screw hole 27 for a screw 28 by which the member is attached to the body 6. In front of the forward loop 25, the wire is bent downward over the snout and flattened, the flattened portion being provided with an aperture 29 through which the stem 22 passes, thus securing the forward end of the member 24 to the body 6.

In using the lure, if it is to be used in swiftly moving water the line is attached to the forward eye 23 and when reeled in the body has a darting motion as heretofore mentioned. When, however, the fishing is to be done in quiet water the line is attached farther back on the body, namely to one or the other of the eyes 25, 26. As a result the darting movement of the lure is attained even in quiet water. The farther back the line is attached the more accentuated this wabbling motion is, but beyond the point of the eye 26 it becomes too great to be of any practical value. By varying the point of the line attachment between the three eyes 23, 25 and 26 the angler is enabled to obtain to a nicety any degree of darting or swimming motion his preference or judgment demands and under any and all water conditions. When fishing in still water, if the angler does not desire the swimming motion but wishes the bait to move forward in a direct line, the fishing line may be attached to the forward fastening, namely, eye 23.

The function of the fins 8, 9 is to cause the lure to dive when reeled in. These fins are set at an angle to cause the minnow to dive to a depth calculated to be most successful under average fishing conditions. The diving motion is also caused by the tapering nose. It will be apparent that the darting or swimming motion which can be attained irrespective of water conditions by a proper variation of the point of line attachment in combination with the diving motion effected by the fins and the tapered nose, results, when the minnow is drawn through the water, in an extremely effective simulation of a live fish—a result made possible by my invention as it was hitherto attained only in the swift current of a river.

Having thus described my invention what I claim as new and desire to secure by Letters Patent, is:—

1. In a fish lure, the combination with a body portion, of a hook associated therewith, and means for varying the degree of wabble effected by the lure when retrieved, said means comprising means for securing the line at a plurality of points at varying distances from the forward end of said body portion.

2. In a fish lure, the combination with a body portion, of a hook associated therewith, means for varying the degree of wabble effected by the lure when retrieved, said means comprising means for attaching the line at substantially the forward point of said body, and alternative means for attaching the line at a plurality of points at varying distances from said forward end.

3. In a fish lure, the combination with a body portion, of a hook associated therewith, and means for varying the degree of wabble effected by the lure when retrieved, said means comprising a plurality of eyes to which the line may be attached, one of said eyes being located at the forward end of said body substantially in line with the major longitudinal axis thereof, the other eyes being located at successive points rearward thereof.

4. In a fish lure, the combination with a body portion, of a hook associated therewith, and means for varying the degree of wabble effected by the lure when retrieved, said means comprising variable line fastening means including an eye located at the forward end of said body and a member bent upon itself to form a plurality of loops, said member being secured at the rear end thereof to said body and having a portion thereof bent downward over the forward end of said body and adapted to be secured between said body and said eye.

In witness whereof, I have hereunto subscribed my name in the presence of two witnesses.

CHARLES HEDDON.

Witnesses:
RICHARD M. JUDD,
JOHN FENINE.